Oct. 14, 1952
C. M. JONES
2,613,533
INSTRUMENT FOR DETERMINING WHEEL BALANCE
Filed April 13, 1948
3 Sheets-Sheet 1
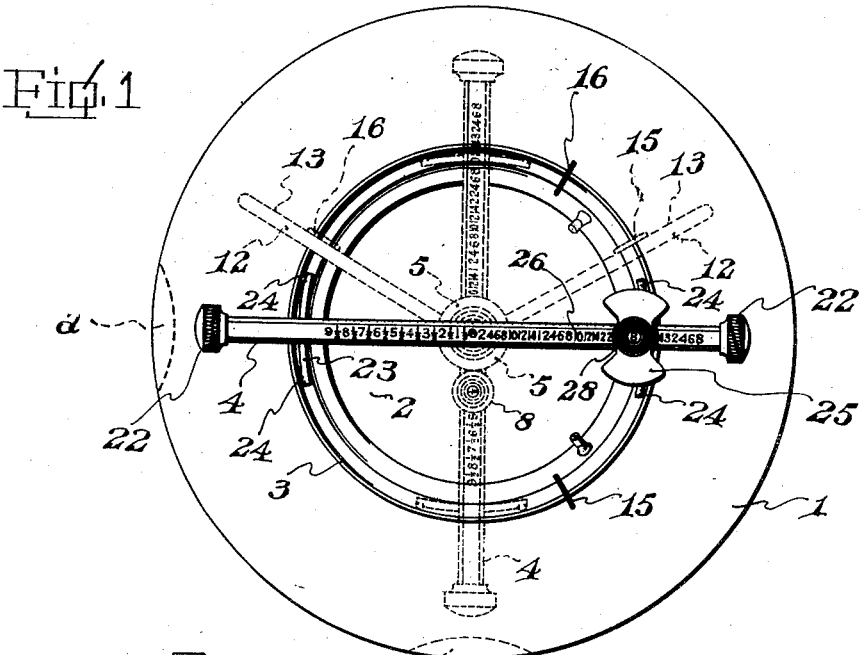
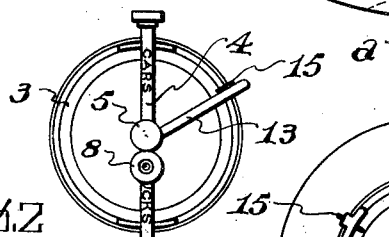
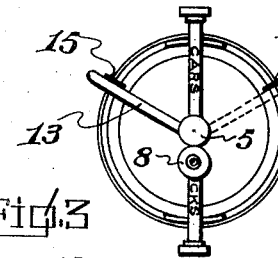
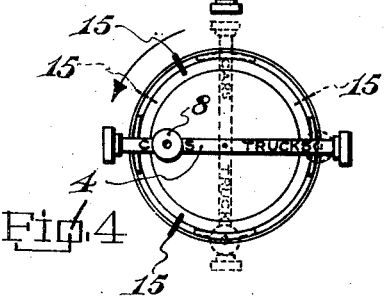
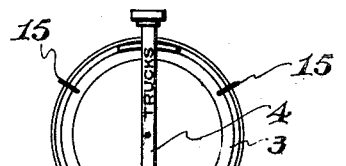
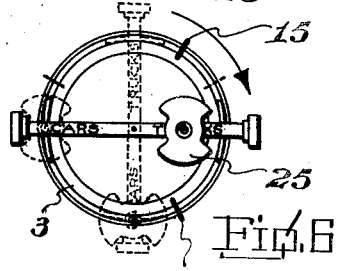
Clarence M. Jones
INVENTOR.
BY Philip A. H. Ferrell
ATTORNEYS.

Oct. 14, 1952 — C. M. JONES — 2,613,533
INSTRUMENT FOR DETERMINING WHEEL BALANCE
Filed April 13, 1948 — 3 Sheets-Sheet 2
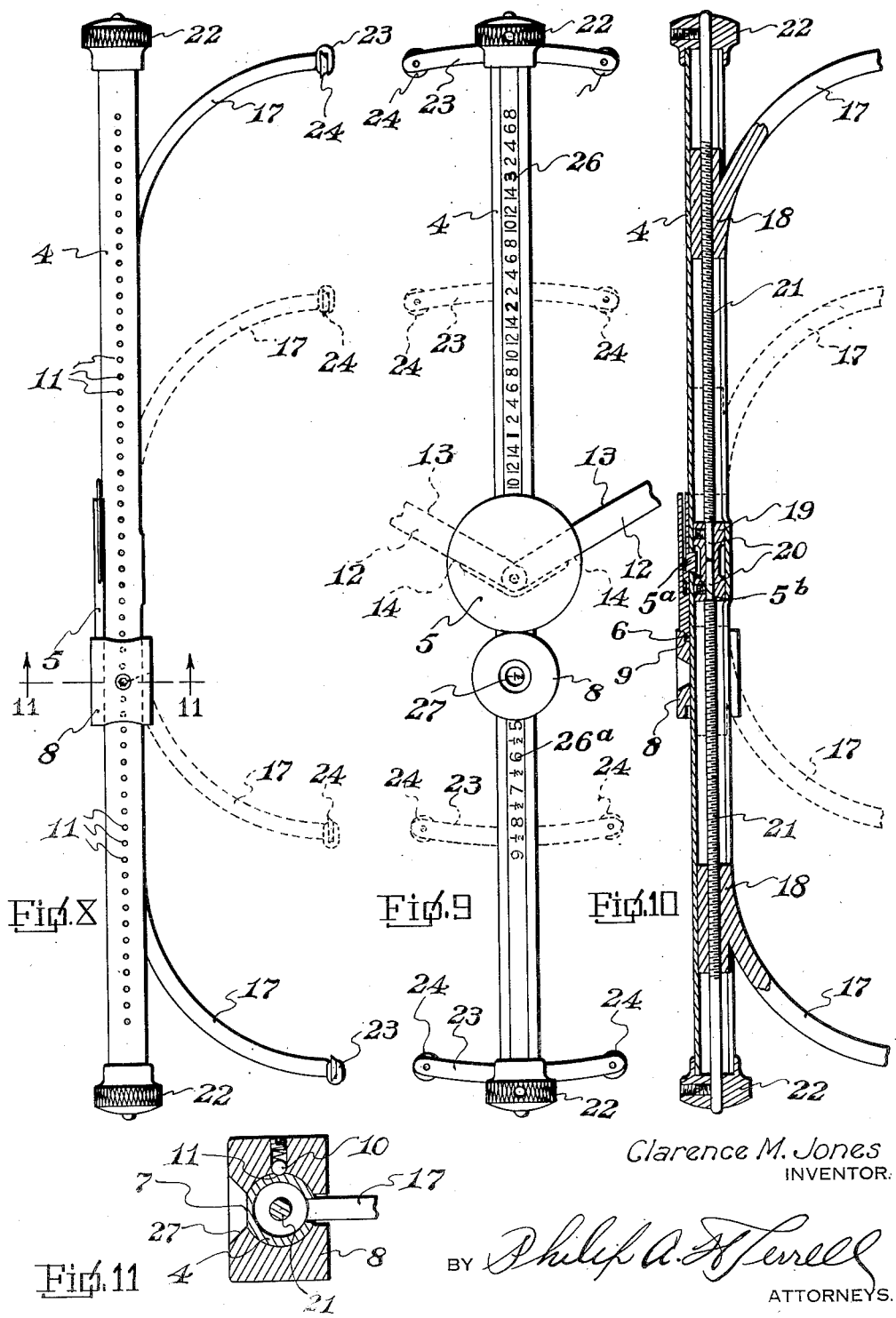

Oct. 14, 1952 C. M. JONES 2,613,533
INSTRUMENT FOR DETERMINING WHEEL BALANCE
Filed April 13, 1948 3 Sheets-Sheet 3
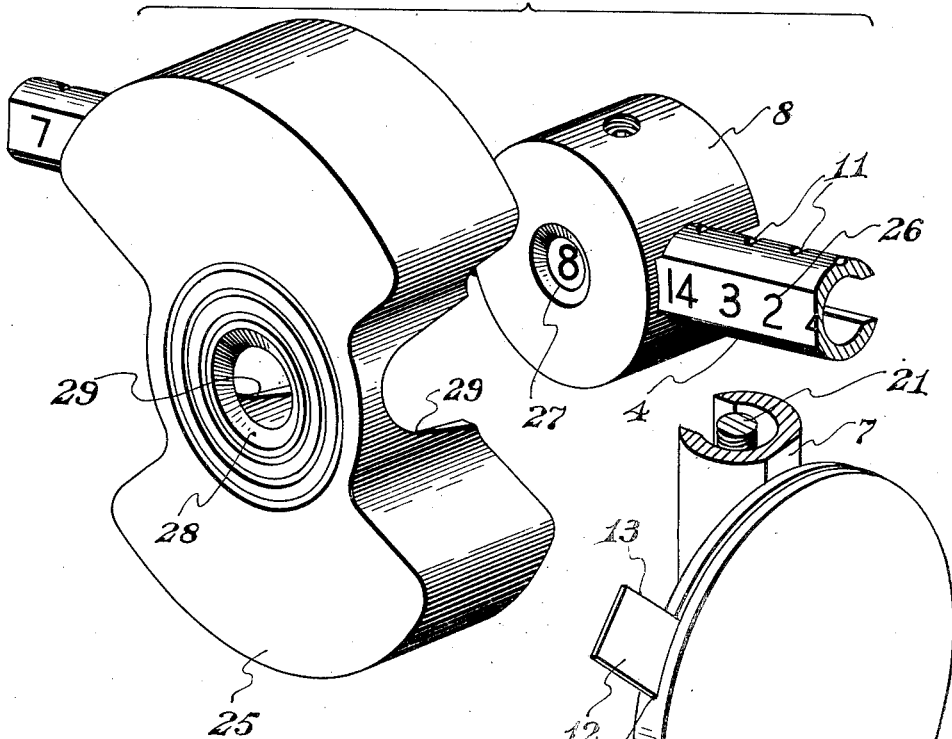
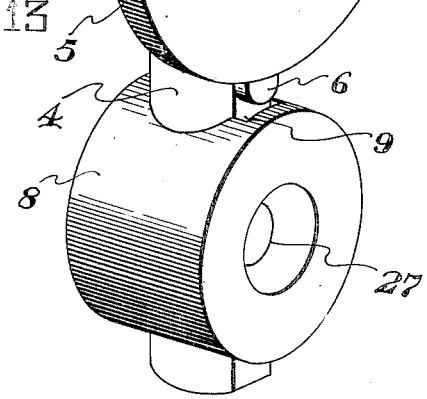
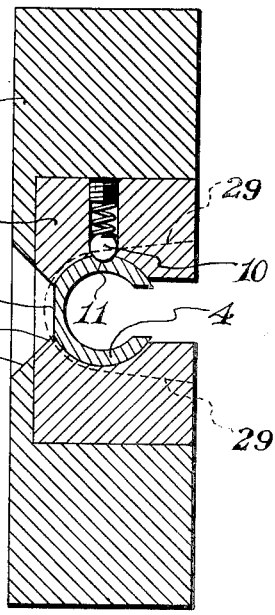
Clarence M. Jones
INVENTOR.
BY *Philip A. H. Terrell*
ATTORNEYS.

Patented Oct. 14, 1952

2,613,533

UNITED STATES PATENT OFFICE 2,613,533

INSTRUMENT FOR DETERMINING WHEEL BALANCE

Clarence M. Jones, Tulsa, Okla.

Application April 13, 1948, Serial No. 20,654

10 Claims. (Cl. 73—66)

The invention relates to instruments for determining the unbalance of a wheel assembly, and has for its object to provide a device of this character which can be placed and supported diametrically across the axis of the wheel, and attached thereto after the unbalance weight of the wheel is downwardly disposed, and then rotated to a horizontal position where the unbalance can be counter-weighted and accurately calculated for the application of weights to the wheel.

A further object is to provide, in connection with the instrument, means whereby couple positions may be established in relation to the center of the unbalance weight on the lower side of the tire, when free of the ground and the unbalance calculated by counter-weight means on the bar for establishing the amount of weight to be applied to the wheel at the two points for applying balancing forces.

A further object is to provide means for supporting the bar on the wheel in a vertical position across the axis of the wheel comprising slidable gripping arms carried by the bar ends, and simultaneously moved inwardly and outwardly for interengaging within the wheel rim.

A further object is to provide the gripping arms with transverse members having elements on the ends thereof for biting into the tire rim and holding the bar in position on a four point support.

A further object is to provide means whereby the supporting arms may be controlled from either end of the graduated bar.

A further object is to form the counter-weight from two weight members which can be assembled or disassembled thereby allowing the smaller weights to be used in connection with passenger cars as distinguished from trucks, or the weights to be assembled for determining the unbalance of truck wheels.

A further object is to detachably connect the weight point establishing device to the bar before the counter-weighting operation.

A further object is to utilize the smaller slidable counter-weight for holding the weight point establishing device on the bar.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a view in elevation of the instrument, showing the instrument applied to a conventional form of truck wheel, and the two positions the device assumes in dotted and full lines.

Figure 2 shows the device supported on a wheel flange, and the marker guide in position for establishing one of the weight applying points.

Figure 3 is a view similar to Figure 2 showing the marker guide swung to the opposite side for establishing the position of the other weight applying point.

Figure 4 is a view similar to Figure 3, but showing the weight point establishing device removed and the bar and wheel rotated to a horizontal position for establishing the unbalance of the wheel.

Figure 5 shows the position of the device on a wheel after the weight points have been established, and showing the weight on the bar.

Figure 6 is a view similar to Figure 5 showing the bar rotated to a horizontal position and the counter-weight shifted to the truck side of the device.

Figure 7 is a view in elevation of the wheel showing the weights applied thereto to correct the unbalance.

Figure 8 is a side elevation of the bar, showing the gripping arms.

Figure 9 is a front elevation of the device.

Figure 10 is a vertical transverse sectional view through the device.

Figure 11 is a horizontal sectional view taken on line 11—11 of Figure 8.

Figure 12 is a collective detail perspective view of the composite counter-weight.

Figure 13 is a perspective view of the central portion of the device showing the method of detachably holding the swinging arm device for establishing the weight applying positions.

Figure 14 is a vertical transverse sectional view through the composite weights.

Referring to the drawing, the numeral 1 designates tire, which tire is unbalanced, and which is to be balanced along with the entire wheel assembly. The tire is carried by the disc wheel 2 having an outwardly curved tire holding flange 3. The balancing operation takes place with the wheel on the vehicle, but jacked up clear of the ground, so it can be rotated to a position where its unbalanced weight is downwardly disposed, as at a. When the weight a is in its lower position, as shown in Figure 1, the device is applied thereto with the graduated bar or scale bar 4 in a vertical position. At this time, the disc 5 is placed on the bar and centered on the axis of the wheel. Disc 5 is provided with a lug 5a which interengages in an aperture 5b in the bar 4. The lower side of the disc 5 is provided with a downwardly extending lug 6 engaging the flat outer surface 7 of the bar, and then the small counter-weight 8 is forced upwardly until the lug 6 enters the recess 9 in the upper side of the weight 8, clearly shown in Figure 13. It will be seen that the disc 5 will be rigidly held against rotation or longitudinal movement in relation to the bar 4. There is a frictional engagement and the weight 8 is held in its various positions by the spring actuated detent 10 cooperating with small recesses 11 in the side of the bar, clearly shown in Figures 8 and 14. After the disc 5 has been placed in position, and the device clamped into position, by means hereinafter set forth, the pivoted arm 12 is swung to one side as shown in dotted lines in Figure 1, and as the marker guide edge 13, thereof, is in radial relation to the axis of the wheel, and as the arm is limited by a shoulder 14, within the disc, positioned to limit the edge 13 to sixty degrees, it is obvious the mark 15 can be placed on the wheel at a sixty degree angle to the axis of the bar 4. Following this operation, the arm 13 is swung to the other side of the bar 4, and the second sixty degree mark 16 is placed on the wheel shown in dotted lines in Figure 1. It will be noted, that after these marks are placed there is a three point arrangement in marks 15, 16 and the unbalance weight a at the bottom of the wheel.

The device is attached to the wheel by inwardly and outwardly curved arms 17 having enlarged portions 18 slidably mounted within the tubular graduated bar 4 and anchored centrally within the tubular bar is a rod connecting member 19 in which connecting member are anchored the inner adjacent ends 20 of the threaded rods 21. Rods 21 have right and left hand threaded connections through the slide portions 18 and terminate at their outer ends in cap nuts 22, which nuts rotate on the ends of the tubular bar. It will be seen that, by rotating either cap nut 22, the arms 17 may be adjusted inwardly and outwardly in relation to each other simultaneously so that both arms are always at the same distance from the center of the bar. Arms 17 curved inwardly and outwardly towards the inner periphery of the wheel flange 3, and are provided with means for gripping the inner periphery of the flange. The gripping means comprises transverse bars 23, carried by the ends of the arms 17, and the ends of the transverse bars are provided with hard steel sharp wheels 24, which will easily cut through the finish on the flange 3, and embed slightly into the metal.

After positions 15 and 16 have been established, the disc 5 with its swinging arm 12 is removed by a downward movement of the small weight 8 which releases the lug 6 therefrom, and following this operation the wheel is rotated until the device is in the horizontal position shown in Figure 1. It will be noted that the unbalance weight a has assumed the horizontal position of the bar 4 at one side of the axis of the wheel and the marks 15 and 16 positioned below and above the bar on the other side of the axis of the wheel. Assuming the device is applied to a truck wheel as shown in Figure 1, the outer heavy member 25 is placed over the small slidable weight 8, thereby adding additional weight, which is desirable where a truck wheel is being balanced, and the truck balancing scale 26 is established in relation to the combined weight of counter-balance members 8 and 25. The composite weight having been assembled is moved outwardly or inwardly from the axis of the wheel on the graduated bar until the proper counterbalancing weight indicia can be seen through the sight openings 27 and 28, reference being had to Figure 1. This will give the weight of the unbalance of the wheel. Knowing the weight of unbalance, the operator makes a note thereof and removes the device from the wheel. In the present case the unbalance weight is indicated at 8. The operator then divides the 8 by two and uses two number 4 weights and places one on each of the previously made marks 15 and 16, and two more 4 weights on the opposite side of the wheel; therefore it will be seen there is a weight equal to the unbalance around the wheel one hundred and twenty degrees apart, consequently the wheel has been balanced. By forming the outer face 7 of the bar flat, it not only provides a flat surface for the indicia, but also prevents the counter-weights from transversely rotating on the bar.

Weight 25 is chambered as shown in Figure 14 for a snug fit on the weight 8, and opposite sides of the weight 25 are recessed as shown at 29 to arch the bar 4 at opposite sides of the weight 8. There is a snug frictional fit between the parts.

In balancing smaller wheels, for instance wheels on pleasure automobiles, less counterbalancing weight is used. When this is done, the outer weight 25 is removed and the small weight 8 is shifted to the other side of the axis for utilizing the other scale which is indicated in smaller denominations. In this incident the leverage gained by shifting the small weight one graduation is much less than the composite weight shifted one graduation on the opposite side of the axis of the wheel. Figure 4 clearly shows the passenger car position of the device and at which time the scale 26 is downwardly disposed at the start of the operation so the scale 26a will swing to the left to horizontal position, and Figure 6 the truck application of the device.

The invention having been set forth what is claimed as new and useful is:

1. A device adapted to be attached to the side of a wheel assembly for measuring and counterbalancing the unbalance weight of the wheel assembly when the unbalanced weight is at the bottom of the wheel, said device comprising a graduated bar applied to the wheel side in a vertical position, means carried by the bar for attaching the bar to the wheel side across the axis of the wheel and at opposite sides of the wheel, means carried by the bar for locating points of application of two balance forces, one on either side of the bar, said means comprising a radial member having a marker guide edge passing through the axis of the wheel, said radial member being swingable to opposite sides of the vertical and limited on opposite sides of the vertical to positions where a marker guide edge will be sixty degrees on either side of the vertical bar, said wheel assembly and vertical bar being rotatable about the wheel axis to place the bar in horizontal alinement with the unbalance of the wheel assembly and a counter-weight slidably mounted on the bar opposite the unbalance portion of the wheel and forming means whereby the weight of the unbalance is established for applying the counter-balance weights to the points of balancing force application.

2. A device as set forth in claim 1 wherein said bar is hollow, the means for attaching the bar to the side of the wheel comprises slidable members within the bar, rotatable oppositely threaded rods threaded through said slidable members whereby they will be simultaneously moved inwardly and outwardly, and arms carried by said slidable members, said arms terminating in gripping members cooperating with the wheel for attaching the device, to the wheel.

3. A device as set forth in claim 1 wherein the counter-weight forms means for holding the radial member detachably on the bar.

4. A device as set forth in claim 1 wherein the means for attaching the bar to the wheel side comprises gripping arms longitudinally movable on the bar and means carried by the bar and cooperating with the arms for simultaneously moving said arms towards and away from each other.

5. A device as set forth in claim 1 wherein said bar is hollow, the means for attaching the device to the wheel side comprises members slidably mounted within the bar, said bar having a guide slot in the rear side thereof, said slidable members having gripping arms extending through said slot and into holding engagement with the wheel, a rotatable shaft within the bar and having right and left hand threads through the slidable members, said rotatable shaft forming means for simultaneously moving the arms towards and away from each other.

6. A device as set forth in claim 1 wherein the outer face of the bar is flattened and graduated, said counter-weight being formed from an inner weight slidably mounted on the bar and having a sight opening therethrough and a second counter-weight housing the last named counter-weight and having a sight opening in registration with the sight opening first mentioned.

7. The combination with a wheel balancing bar adapted to be attached to the outer side of a wheel having a tire thereon for a balancing operation, of means for attaching said bar to the inner periphery of one of the wheel flanges, said means comprising slidable members carried by the bar, flange engaging arms carried by the slidable members and means cooperating with the slidable members for simultaneously moving the flange engaging arms inwardly or outwardly for a releasing or gripping operation.

8. The combination with a balancing bar adapted to be placed across the axis of a wheel and be attached to the wheel flange on the inner periphery thereof, of means for attaching the ends of the bar to the wheel flange, said means comprising inwardly extending arms carried by the ends of the bar and adjustable towards and away from each other on the ends of the bar, the outer ends of said arms terminating in transverse cross members, and gripping and biting elements carried by the ends of the transverse cross members in the plane of the flange and adapted to bite into said flange.

9. A device as set forth in claim 1 wherein the counter-weight is formed from a plurality of members detachably connected together and detent means carried by one of said counter-weight members and cooperating with spaced detent means on the bar in registry with graduations on the bar.

10. A device as set forth in claim 1 wherein the bar is provided with weighing indicia scales for light and heavy wheels, said counter-weight being formed from composite members, one removable from the other, thereby allowing the use of a lesser weight for light wheels and a heavier weight for heavy wheels on opposite sides of the axis of the wheel.

CLARENCE M. JONES.

REFERENCES CITED

The following references are of record in the file of this patent:

UNITED STATES PATENTS

| Number | Name | Date |
|---|---|---|
| 2,197,808 | Mason | Apr. 23, 1940 |
| 2,201,982 | Bazarek | May 28, 1940 |
| 2,341,443 | Hunter | Feb. 8, 1944 |
| 2,349,552 | Holmes | May 23, 1944 |